United States Patent
Berthelot et al.

(10) Patent No.: US 10,816,827 B2
(45) Date of Patent: Oct. 27, 2020

(54) PROCESS FOR MANUFACTURING AN OPHTHALMIC LENS EQUIPPED WITH AN INSERT

(71) Applicant: Essilor International, Charenton-le-Pont (FR)

(72) Inventors: Laurent Berthelot, Charenton-le-Pont (FR); Claudine Biver, Charenton-le-Pont (FR); Marc Reignault, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/126,224

(22) PCT Filed: Mar. 18, 2015

(86) PCT No.: PCT/EP2015/055620
§ 371 (c)(1),
(2) Date: Sep. 14, 2016

(87) PCT Pub. No.: WO2015/140194
PCT Pub. Date: Sep. 24, 2015

(65) Prior Publication Data
US 2017/0082872 A1    Mar. 23, 2017

(30) Foreign Application Priority Data
Mar. 19, 2014   (EP) ..................... 14305384

(51) Int. Cl.
*B29D 11/00* (2006.01)
*G02C 11/00* (2006.01)
(Continued)

(52) U.S. Cl.
CPC .......... *G02C 11/10* (2013.01); *B29C 37/0082* (2013.01); *B29D 11/00692* (2013.01);
(Continued)

(58) Field of Classification Search
CPC .............. G02B 6/0001; G02B 27/0172; B29D 11/00692; B29C 37/0082; G02C 11/10
See application file for complete search history.

(56) References Cited

U.S. PATENT DOCUMENTS

| | | | | |
|---|---|---|---|---|
| 7,800,827 B2 * | 9/2010 | Moliton | ................... | G02B 6/10 264/1.1 |
| 2007/0159562 A1 * | 7/2007 | Haddock | ................... | G02C 7/08 349/13 |

(Continued)

FOREIGN PATENT DOCUMENTS

| | | |
|---|---|---|
| CN | 102958684 A | 3/2013 |
| EP | 0552498 A1 | 7/1993 |
| FR | 2062201 A5 | 6/1971 |
| JP | 58-120217 * | 7/1983 |
| WO | 2011095379 | 8/2011 |

OTHER PUBLICATIONS

English translation of second Chinese Office Action in CN Application No. 201580014040.4 (9 pages).
(Continued)

*Primary Examiner* — Mathieu D Vargot
(74) *Attorney, Agent, or Firm* — Oblon, McClelland, Maier & Neustadt, L.L.P.

(57) ABSTRACT

The invention relates to a process for manufacturing an ophthalmic lens element equipped with an insert (1), this ophthalmic lens element comprising a front face and a back face, comprising steps consisting in: providing a first portion or intermediate product (2, 2") made of a first material comprising a first and second frontal face (2A, 2B, 2A", 2B"), said second face forming the back or front face of said ophthalmic lens element; placing the insert (1) on said first face of said intermediate product; depositing a second material in liquid form on said first face of the intermediate product (2, 2") so as to cover at least partially said insert with said second material; and solidifying said second material in (Continued)

order to form an integral second portion (4) of said intermediate product. According to the invention, said first material is organic.

11 Claims, 4 Drawing Sheets

(51) Int. Cl.
| | | |
|---|---|---|
| *B29C 37/00* | (2006.01) | |
| *F21V 8/00* | (2006.01) | |
| *G02B 27/01* | (2006.01) | |
| *B29L 11/00* | (2006.01) | |

(52) U.S. Cl.
CPC ....... *G02B 6/0001* (2013.01); *G02B 27/0172* (2013.01); *B29L 2011/0016* (2013.01); *G02B 2027/0178* (2013.01); *G02C 2202/16* (2013.01)

(56) References Cited

U.S. PATENT DOCUMENTS

| | | |
|---|---|---|
| 2010/0078837 A1 | 4/2010 | Pugh et al. |
| 2013/0037202 A1 | 2/2013 | Ando et al. |
| 2013/0069260 A1 | 3/2013 | Buchon et al. |
| 2015/0146159 A1* | 5/2015 | Archer ............. B29D 11/00144 351/159.03 |

OTHER PUBLICATIONS

Office Action dated Aug. 10, 2018, in Chinese Patent Application No. 201580014040.4 (with English translation.).

Tianren Shan, "Guidelines for Automatic Technology Practice," Zidonghua Jishu Shijian Zhinan, China Railway Press, Feb. 1983.

Li Cai, "Optical Parts Processing Technology," Second Edition, Weapon Industry Press, Apr. 2006, pp. 364-367, with partial English translation.

\* cited by examiner

PROCESS FOR MANUFACTURING AN OPHTHALMIC LENS EQUIPPED WITH AN INSERT

The invention relates to a process for manufacturing an ophthalmic lens for a pair of spectacles, said lens being equipped with an insert.

It in particular relates to a lens intended to be used as an optical display, the insert being a waveguide intended to receive optical beams via an entrance surface and to guide said beams towards the eye of the wearer so as to create an informative image.

A process for manufacturing such a lens is described in patent document WO 2011/095379, in which a lens blank or puck is moulded and then processed by machining and polishing to form the front and back faces of the lens.

In this document, the mould comprises a first mould portion intended to mould the front face of the puck, and a second portion intended to mould the back face of the puck. A pad joined to the second portion of the mould is, on the one hand, intended to form a moulded cavity, in order to produce the free surface through which the optical beams enter into the waveguide, and, on the other hand, used to receive the waveguide before moulding. To do this, the waveguide is temporarily fastened to the pad before moulding, preferably by adhesive bonding by means of a monomer layer.

This being so, such a process requires such a pad to be produced with very strict parallelism and alignment tolerances since the correct position of the waveguide inside the mould and therefore in the moulded puck depends on its shape, its dimensions and its position.

In addition and above all, the waveguide must be adhesively bonded to the pad with a high positional precision for the same reason.

Specifically, the precise three-dimensional position of the waveguide in the finished lens is of utmost importance. The assembly must meet precise optical specifications, both with respect to real vision and with respect to the informative display. It is also necessary to limit component volumes, in order to obtain an article that is light and thin. The assembly must also meet aesthetic criteria.

Moreover, it is essential for the integrity of the waveguide not to be compromised when the puck is machined and polished to form the front and back faces of the lens. More precisely, a poorly positioned waveguide may cause the tool to collide with the waveguide and it to break during the machining of the front and back faces of the lens, or even during trimming of the latter.

Lastly, this type of moulding inevitably induces mechanical stress effects that create imperfections in the finished lens, delamination effects or that weaken the insert. Even if great care is taken when positioning the insert, the moulding material may be subject to substantial shrinkage or substantial thermal stresses when it is polymerised. These effects, associated with gravity or channelling of the material in the mould, may lead stresses to be exerted on the insert, which stresses are liable to move it or even lead it to break, for example during subsequent phases of surfacing, trimming or coating.

Moreover, patent document EP 0 552 498 describes a process for manufacturing an ophthalmic lens element equipped with an insert, comprising steps consisting in:
  forming a composite product consisting of a mineral glass element provided with a thin layer of adhesive material and intended to form the front face of an ophthalmic lens;
  placing an insert on this composite product;
  depositing a second material in liquid form on the composite product so as to cover the insert with said second material; and
  solidifying the second material.

The mineral glass element cannot be machined or trimmed to obtain a shape corresponding to the outline of the frame of a pair of spectacles and must therefore have its definitive shape at the start of this process.

Moreover, the presence of a thin layer of adhesive material leads to a risk of air bubbles being present between this composite product and the insert.

The invention solves these problems by providing a process for manufacturing a lens that limits the amount of moulding material employed, and thus limits the stresses exerted on the insert, and by providing embodiments that allow the position of the insert within the finished lens to be known with great precision, and the contact area between the insert and the moulding material to be decreased, this process nonetheless remaining simple and implementable by means of relatively simple tools.

To do this, the invention provides a process for manufacturing an ophthalmic lens element equipped with an insert, this ophthalmic lens element comprising a front face and a back face, characterised in that it comprises steps consisting in:
  providing a first portion or intermediate product made of a first material comprising a first and second frontal face, said second face forming the back or front face of said ophthalmic lens element;
  placing the insert on said first face of said intermediate product;
  depositing a second material in liquid form on said first face of the intermediate product so as to cover at least partially said insert with said second material; and
  solidifying said second material to form an integral second portion of said intermediate product,
  characterised in that said first material is organic.

The invention also has the advantage, relative to conventional casting processes, of making it possible to decide on the position of the insert at the moment when it is desired to integrate it into the lens, this allowing, for example, positional and thickness properties related to the wearer to be taken into account without specific tools being required.

An ophthalmic lens is intended to be placed in front of the eye of a wearer in order to correct his vision, protect the eye or attenuate the amplitude of the light arriving on the retina of the eye.

Here, the expression "ophthalmic lens element" is understood either to mean a lens blank, also called a "puck", or a semi-finished lens one of the faces of which has been finished, or an untrimmed finished lens, i.e. a lens the two faces of which have been finished but the outline of which has not yet been ground to fit in a spectacle frame, or a trimmed finished lens, i.e. a lens both faces of which have been finished and the outline of which has been trimmed to fit in a spectacle frame.

The insert may be any element that, inserted into a lens, is liable to see its fragility increased or that risks breaking during machining/trimming/coating operations if a conventional insertion solution is used, or the position of which in said lens is critical with regard to optical constraints or to meeting thickness specifications or to avoiding the risk of damage. By way of example, it may be an optical waveguide or a controllable optical module such as, for example, a liquid-crystal module (with or without Fresnel lens), an electrochromic module, a photochromic module or other filtering module, a fluidic module or even a scattering module.

By virtue of the invention, no layer of adhesive material over the entire area of the glass element is necessary.

According to one preferred embodiment, the step of depositing the second material is carried out so that said second portion is shaped to be the front or back face of said ophthalmic lens element.

This deposition may for example be carried out by moulding or 3-D printing (additive manufacturing).

Advantageously, the process furthermore comprises a step consisting in machining said second portion in order to shape the front or back face of said ophthalmic lens element.

Preferably, said first face comprises a recess suitable for receiving at least one portion of the insert and, in the step of depositing the second material, at least one portion of said insert is placed in said recess.

The term "recess" may here mean a locating hole, a slot, an insertional portion, a housing, a base, a notch, a void, a groove, a trench, a slit or a shoulder for example.

This recess may be produced in an intermediate part of the ophthalmic lens element, here for example a semi-finished lens, in the position where it is desired to integrate the insert when it is integrated. It is not necessary to have provided beforehand precise tools to position this insert in the right place. This increases flexibility or the freedom of choice relative to conventional casting processes, which require this type of tool to hold the insert. The recess may be produced and positioned by very precisely machining the intermediate part. Its position may be optimised relative to the desired final lens (in terms of thickness, curvature, etc.).

Apart from making it possible to position the insert with great precision, this recess makes it possible to decrease the amount of second material employed and therefore the shrinkage that occurs during its solidification. Specifically, the shrinkage of the second material increases as the amount of material employed increases. When the insert is perfectly housed in a recess, the apparent area of the insert, i.e. the area of the insert that emerges from the recess and that will make contact with the second material, is smaller than when the insert is simply placed on a flat surface not containing a recess. Thus, the amount of second material required to overmould the insert is smaller when the insert is housed in a recess than when this is not the case.

Advantageously, in the step of depositing the second material, said insert is held on said first face.

For example, the insert may be held by adhesive bonding or capillary action, thereby preventing it from moving and bubbles from forming between the insert and the first portion during the deposition step.

The second face of said intermediate product being opposite said first face, said second face may be formed by moulding or machining in order to form said back or front face of said ophthalmic lens element.

Preferably, said intermediate product comprises a positional reference for the insert on its second face or between its first and its second face.

The first material is advantageously compatible with the second material.

The term "compatible" is understood to mean compatible in terms of refractive index, adhesion, glass transition temperature, mechanical properties, thermal expansion coefficient, tint, etc.

Furthermore, the first material of said intermediate product is preferably identical to the second material.

The invention relates to an intermediate product for use in such a process.

Preferably, the intermediate product comprises a recess for receiving at least one portion of the insert on its first face.

The second face may form said back or front face of said ophthalmic lens element.

The invention relates to an ophthalmic lens element intended to be used as an optical display and manufactured by means of such a process, said element being intended to be placed in front of one eye of a wearer, the insert being a waveguide intended to receive optical beams via an entrance surface and to guide said optical beams toward the eye of the wearer so as to create an informative image on said eye.

The invention also relates to such an ophthalmic lens element manufactured by means of such a product, characterised in that the intermediate product furthermore comprises a recess that opens onto one edge of said cavity and in that said entrance surface is formed by said recess.

Lastly, the invention relates to an ophthalmic lens element manufactured by means of such a process, the insert being a controllable optical module.

The invention is described in greater detail below by way of the figures, which show only preferred embodiments of the invention.

Although first specifically described and shown in the figures for the case where the insert 1 is a waveguide intended to receive optical beams, via an entrance surface located on a flush edge of the insert, and to guide said optical beams toward the eye of the wearer so as to create an informative image on the eye, the ophthalmic lens being intended to be used as an optical display and being intended to be placed in front of one eye of a wearer in order to correct his vision, the process may apply to any element that, inserted into the lens, is liable to see its fragility increased or that risks breaking during machining/trimming/coating operations if a known production solution is used, or the position of which in said lens is critical with regard to optical constraints or to meeting thickness specifications or to avoiding the risk of damage. As specified above, the insert may also be a controllable optical module, such as a liquid-crystal module (with or without Fresnel lens), an electrochromic module, a photochromic module or other filtering module, a fluidic module or even a scattering module.

Figure 1A:
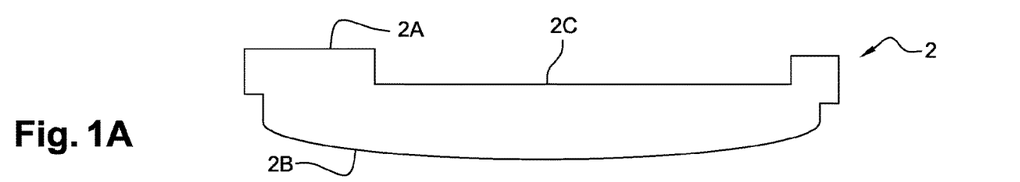
FIGS. 1A to 1C are cross-sectional views illustrating a manufacturing process according to a first embodiment.
Figure 1B:
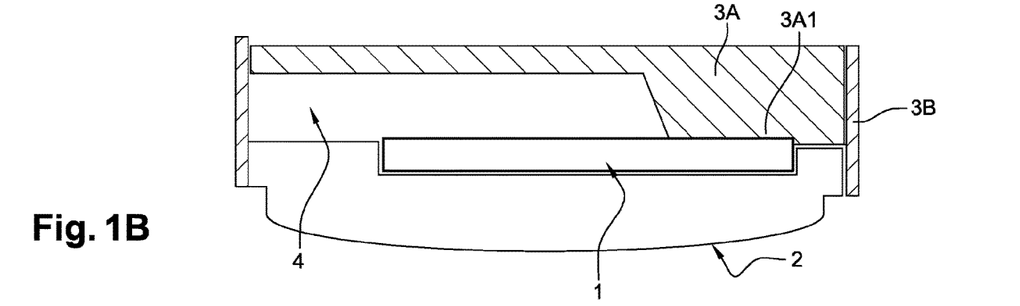
Figure 1C:
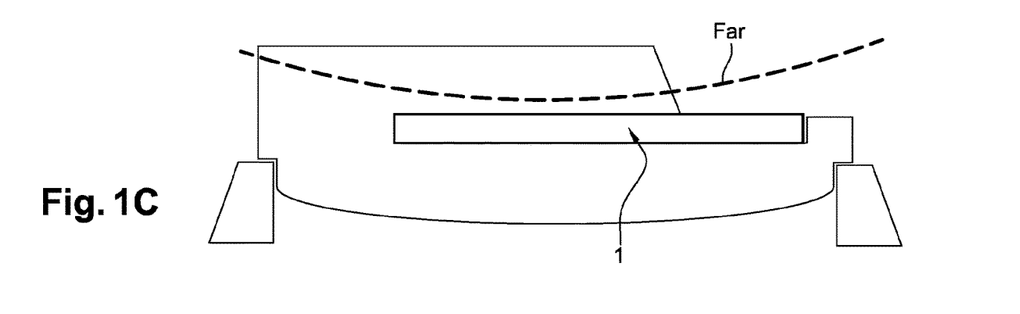

As illustrated in FIGS. 1A to 1C, a process for manufacturing an ophthalmic lens element equipped with an insert 1, this ophthalmic lens element comprising a front face and a back face, comprises steps consisting in:

providing a first portion or intermediate product 2 made of a first material comprising a first and second frontal face 2A, 2B, the second face 2B forming the front face of the ophthalmic lens element;

placing the insert 1 directly on said first face 2A of this intermediate product;

depositing a second material in liquid form on the first face 2A of the intermediate product so as to cover at least partially the insert 1 with this second material, by means of mould portions, one of which 3A is frontal and the other of which 3B is lateral and peripheral; and solidifying this second material in order to form an integral second portion 4 of said intermediate product 2.

The frontal and peripheral mould portions 3A and 3B may or may not be of integral construction. Furthermore, the frontal portion 3A may completely or only partially cover the second portion 4 on which the second material is deposited. The frontal portion 3A may for example be limited level with the thickest zone located on the left in FIG. 1B.

The second face 2B may be shaped by moulding or machining to form the front face of said ophthalmic lens element, here a finished ophthalmic lens. The intermediate product comprises a recess 2C for receiving the insert on its first face 2A, which is shaped to obtain the final desired position of the insert in the ophthalmic lens.

The frontal mould portion 3A comprises a moulding section 3A1 leaving flush an edge of the insert 1 on the side of the back face of the ophthalmic lens, which is intended to form the entrance surface of the waveguide, this guide being intended to receive optical beams.

As illustrated in FIG. 1C, the process furthermore comprises a step consisting in machining the second portion 4 in order to shape the back face Far of the ophthalmic lens element. Alternatively, the frontal mould portion 3A may be shaped so as to generate the desired back surface directly, a machining step then not being required.

The first material is advantageously compatible with the second material. The term "compatible" is understood to mean compatible in terms of refractive index, adhesion, glass transition temperature, mechanical properties, thermal expansion coefficient, tint, etc. Furthermore, the first material of said intermediate product is preferably identical to the second material.

It is chosen to use resins that polymerise via a polyaddition reaction, preferably without releasing by-products (so as to limit shrinkage effects) and in particular epoxy resins associated with a curing or cross-linking agent. The most frequently used curing agents are amines, acids or acid anhydrides. Various types of epoxides may be used, such as aliphatic, cycloaliphatic or aromatic epoxides. Mention will be made, by way of example, of bisphenol A diglycidyl ether, bisphenol F diglycidyl ether, butanediol diglycidyl ether, trimethylol propane triglycidyl ether and the corresponding oligomers. As regards curing agents, the choice will possibly be made from di-, tri- or polyfunctional compounds but monofunctional components may also be incorporated. The choice will possibly be made from aliphatic amines, such as ethylenediamine, triethylenetetramine, hexamethylenediamine, N,N-dimethylhexamethylenediamine, cycloaliphatic amines such as isophorone diamine, or even aromatic amines such as m-phenylenediamine or 4,4'-diaminodiphenylmethane. These products may be skillfully blended in order to achieve, by way of a compromise, the sought-after properties.

Figures 2A, 2B:
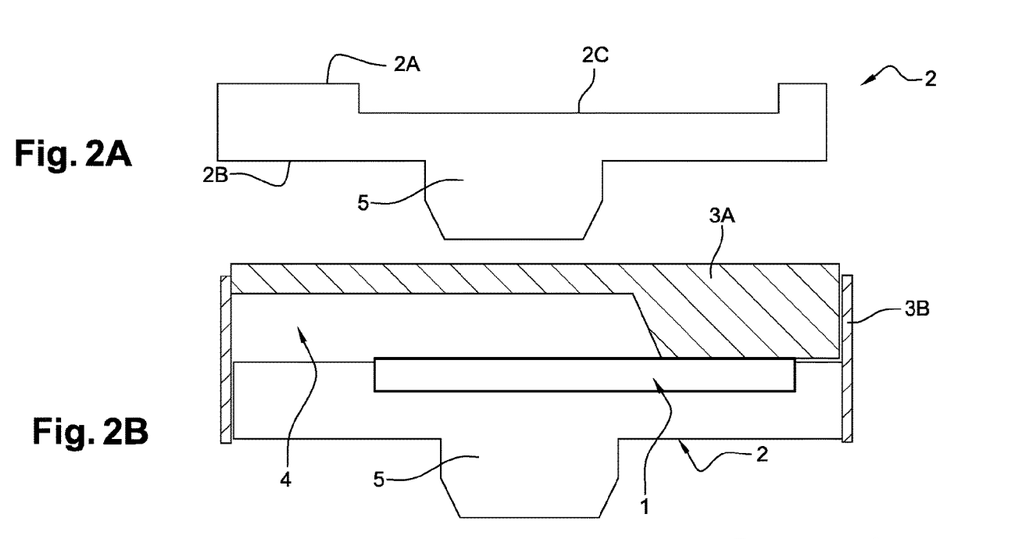
FIGS. 2A to 2C are cross-sectional views illustrating a manufacturing process according to a second embodiment.
Figure 2C:
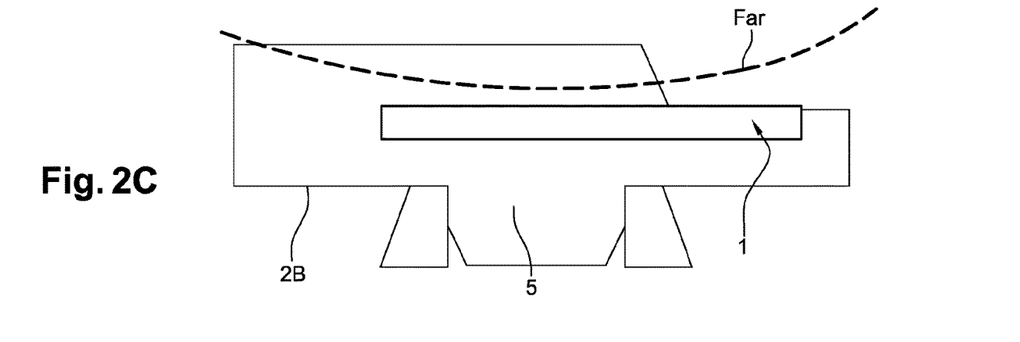

As illustrated in FIGS. 2A to 2C, a process for manufacturing an ophthalmic lens element equipped with an insert 1, this ophthalmic lens element comprising a front face and a back face, comprises steps consisting in:

providing a first portion or intermediate product 2 made of a first material comprising a first and second frontal face 2A, 2B, and that here is a blank or puck provided with a pad 5 allowing it to be held and providing a positional reference;

placing the insert 1 directly on the first face 2A of this intermediate product in a recess 2C borne by the first frontal face 2A of the puck;

depositing a second material in liquid form on the first face 2A of the intermediate product so as to cover at least partially the insert 1 with this second material, by means of mould portions, one of which 3A is frontal and the other of which 3B is lateral and peripheral; and solidifying this second material in order to form an integral second portion 4 of said intermediate product 2.

The frontal and peripheral mould portions 3A and 3B may or may not be of integral construction. Furthermore, the frontal portion 3A may completely or only partially cover the second portion 4 on which the second material is deposited. The frontal portion 3A may for example be limited level with the thickest zone located on the right in FIG. 2B.

As illustrated in FIG. 2C, the process furthermore comprises a step consisting in machining the second portion 4 in order to shape the back face Far of the ophthalmic lens, which step will be followed by a second machining step in order to shape the front face of the finished ophthalmic lens, on the side of the second frontal face 2B. This second machining step is carried out by blocking the back face Far of the ophthalmic lens.

A polarising film may also be added to the ophthalmic lens. To do this, three options are envisionable:

either an intermediate part already containing a polarising film is used, said film being positioned so as not to hinder production of the recess and correctly oriented relative to the polarisation axis of the light output from the waveguide;

or the polarising film is adhesively bonded to the front face of the finished ophthalmic lens with the correct orientation;

or the intermediate part is provided with a system for holding a curved polarised film, which is oriented in the correct direction relative to the polarisation axis of the light output from the waveguide; in this case, the module or waveguide is positioned in the recess, a first casting is carried out in order to encapsulate this portion, and then the curved polarising film is fitted. The polarising film and the first portion containing the waveguide are positioned such that during the second casting possible air bubbles are easily removed.

Figure 3A:
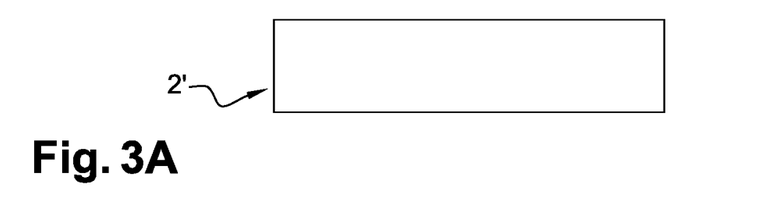
FIGS. 3A to 3D are views illustrating a manufacturing process according to a third embodiment.
Figure 3B:
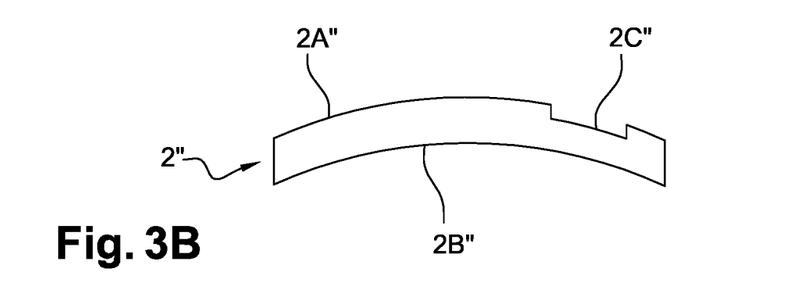
Figure 3C:
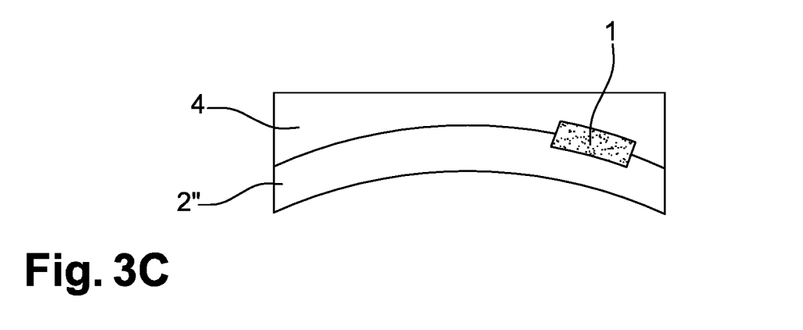

As illustrated in FIGS. 3A to 3D, a process for manufacturing an ophthalmic lens element equipped with an insert 1, this ophthalmic lens element comprising a front face and a back face, comprises steps consisting in:

providing a first portion or intermediate product 2", shown in FIG. 3B and made of a first material, comprising a first and a second frontal face 2A", 2B", which faces are produced by machining a single puck 2' (shown in FIG. 3A);

placing the insert 1 directly on the first face 2A of this intermediate product in a recess 2C" also machined in the puck 2';

depositing a second material in liquid form on the first face 2A" of the intermediate product so as to cover at least partially the insert 1 with this second material, by means of mould portions; and solidifying this second material in order to form an integral second portion 4 of the intermediate product 2", as shown in FIG. 3C.

The second face 2B" is here shaped by moulding or machining to form the back face of the ophthalmic lens element, here a finished ophthalmic lens.

Figure 3D:
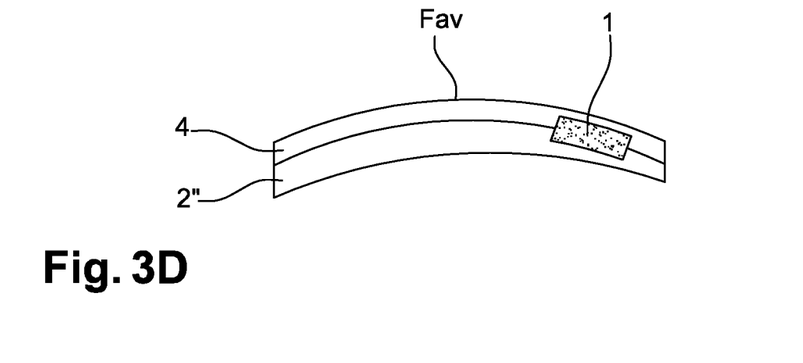

As illustrated in FIG. 3D, the process furthermore comprises a step consisting in machining the second portion 4 in order to shape the front face Fav of the ophthalmic lens element.

Figure 4A:
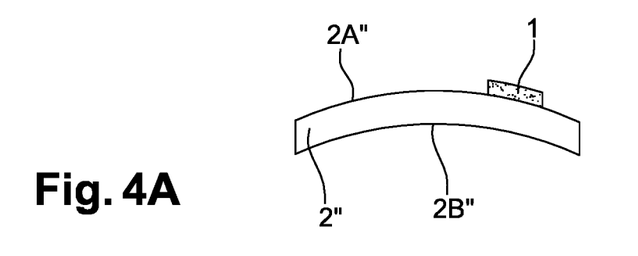
FIGS. 4A to 4C are views illustrating a manufacturing process according to a fourth embodiment.
Figure 4B:
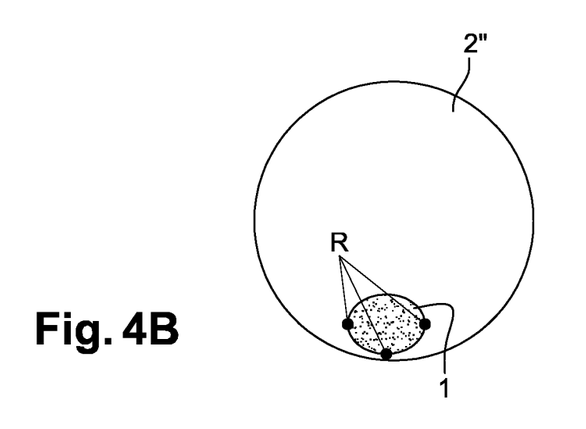
Figure 4C:
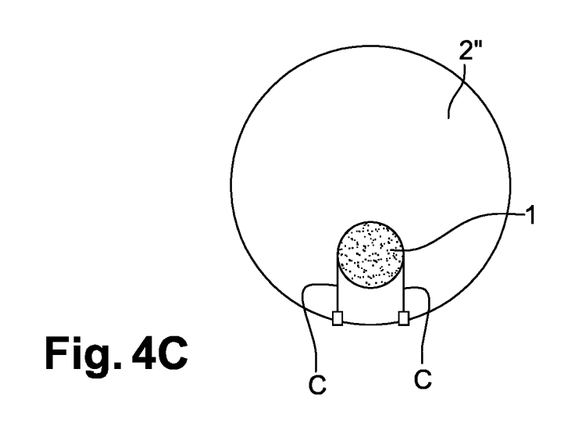

According to one variant embodiment shown in FIGS. 4A to 4C, the insert 1, here an active optical component, may also be adhesively bonded to a frontal face of the intermediate product 2" by virtue of visual reference marks R ensuring the insert 1 is correctly positioned, these marks being arranged on the intermediate product 2".

The manufacturing process then comprises steps consisting in:
- providing a first portion or intermediate product 2", shown in FIG. 4A and made of a first material, comprising a first and a second frontal face 2A", 2B", which faces are produced by machining a single puck 2' (shown in FIG. 3A);
- adhesively bonding the insert 1 to the first face 2A" of this intermediate product;
- depositing a second material in liquid form on the first face 2A" of the intermediate product so as to cover at least partially the insert 1 with this second material, by means of mould portions; and
- solidifying this second material in order to form an integral second portion of the intermediate product, as described above with regard to FIG. 3C.

The insert 1 may consist of an active optical component equipped with electrical, mechanical, optical or fluidic means allowing it to be supplied with power and/or controlled. These communicating means may be contact-based (wired contact for example) or contactless (communicating via magnetic fields for example). As shown in FIG. 4C, the insert 1 may consist of an active optical component equipped with conductors C such as metal wires forming connectors on the edge of the ophthalmic lens after it has been trimmed, these connectors allowing the component to be activated. These conductors C may be made of metal (aluminium, gold, silver or copper for example). Their diameter will be small in order to limit their visibility, preferably smaller than 100 µm and more particularly smaller than 50 µm. They may be adhesively bonded to the surface of the intermediate product 2" by a double-sided adhesive tape or a fast curing adhesive, a UV curing adhesive for example. The adhesive tape or adhesive is then removed during trimming of the ophthalmic lens. The conductors C may also be produced using thin transparent films such as films of indium tin oxide (ITO) or fluorine-doped tin oxide, or even other inorganic conductive materials such as aluminium- or gallium-doped zinc oxide (AZO, GZO).

By way of example, the insert 1 being a Fresnel module, the material used to produce the second portion is an epoxy/amine formulation that meets the aforementioned material choice criteria, in particular that of a low-shrinkage optical material. It contains three constituents: two epoxide constituents (ERISYS GE30 and ARALDITE PY 306 CH) and an amine (ARADUR 42BD) that serves as a curing agent. These materials have the following chemical natures and suppliers:
- ERISYS GE30, which is sold by Emerald Performance Materials CVC Thermoset specialities, is a trimethylol propane triglycidyl ether polymer;
- ARALDITE PY 306 CH, which is sold by HUNTSMAN, is a (2,2'-[methylenebis(phenyleneoxymethylene)] bisoxirane); and
- ARADUR 42BD, which is sold by HUNTSMAN, is a (3-aminomethyl-3,5,5-trimethylcyclohexylamine).

The components are mixed so as to obtain, after polymerisation, a material the refractive index of which is close to that of the glass substrates used to produce the Fresnel modules, i.e. close to 1.52. The amounts of epoxy resins used to produce the intermediate product and the overmoulded second portion 4 are equal to 36 g and 21 g, respectively. The proportion by weight of each constituent is 62.1% ERISYS GE30, 15.4% ARALDITE PY 306 CH and 22.5% ARADUR 42BD.

An example of a Fresnel module is given in United States patent application US 2013/0037202.

First the ARALDITE PY 306 CH is preheated to 80° C. for at least one hour because this product has a tendency to crystallise and it is necessary to melt any crystals that may be present. Next, the resin is left to cool to room temperature before being mixed with the rest of the formulation, in order to prevent the polymerisation from occurring too rapidly.

The required amount of ERISYS GE30 is weighed in a plastic beaker. The required amount of ARALDITE PY 306 CH is added thereto. These two constituents are thoroughly stirred in order to mix them before the curing agent ARADUR 42BD is added. Once the ARADUR 42BD has been added, the polymerisation begins and the mixture thickens. This polymerisation takes place slowly at room temperature but accelerates as temperature increases.

All of the preparation is thoroughly mixed for 45 mins using a HEIDOLPH mechanical stirrer equipped with a stirring blade.

After stirring, the mixture obtained is left to degas for 30 mins in a vacuum bell jar at a pressure of about 5 mbar, with magnetic stirring. The start of the degassing is monitored in order to prevent any overflow, the mixture having a tendency to foam. The magnetic stirring is stopped one or two minutes before the vacuum is vented in order to allow the remaining bubbles to reach the surface.

The epoxy resin is ready to be used immediately to produce intermediate products 2 and overmoulded second portions 4.

The lengths and conditions of the stirring and vacuum degassing operations are given here for preparations of 80 to 120 g of resin, enough to produce one or two intermediate products and one or two second portions (overmoulds). These conditions will need to be adapted to the quantities prepared.

The epoxy resin is poured into a silicone mould of 60 mm diameter in order to form the raw puck 2'. The amount poured in is about 36 g, thereby allowing an 11 mm-thick puck to be obtained. This thickness was determined in order to obtain the optical area required for the following surfacing step in which the recess is produced. The resin is left to rest for one hour after it has been poured in order to allow any bubbles created while it was being poured to reach the surface. These surface bubbles will then be removed during the surfacing. The epoxy resin is then polymerised using the polymerisation cycle described below.

Both faces of the module 1 to be encapsulated are cleaned with ethanol using lint-free paper.

The surfaced puck 2" containing the recess 2C" is cleaned with a jet of ethanol from a wash bottle, followed by dipping in an ethanol bath in order to remove dust and machining residues. It is then dried under a jet of compressed air. The cleanliness of the recess 2C" and in particular the cleanliness of its edge is checked using a stereo microscope. If required, additional cleaning may be carried out.

Two small bits of double-sided adhesive tape are positioned on the edge of the puck plumb with the position of the conductive wires on the module. They will allow the aluminium wires to be held in place once the module has been positioned in the recess and to prevent the aluminium wires from moving when the overmoulding resin is poured. Two drops of epoxy resin are deposited in the recess before the Fresnel module, held by a vacuum pen, is delicately inserted. The presence of the resin allows the module to be correctly positioned by sliding in the recess and helps with the removal of any bubbles trapped on the edges of the recess.

When the module is correctly positioned, the two aluminium wires are then placed on and adhesively bonded to the bits of adhesive tape. The puck containing the module is then inserted into a silicone mould of 60 mm diameter, care being taken to not damage the aluminium wires.

21 g of epoxy resin is poured onto this puck, care being taken not to create bubbles during the deposition. The assembly is left at rest for one hour after the resin has been poured in order to allow any bubbles created to reach the surface.

The epoxy resin is polymerised in a programmable MEM-MERT oven. The silicone moulds containing the resin are placed in the oven on a plate the level of horizontality of which will have been checked and adjusted beforehand.

The polymerisation cycle of the resin is defined in order:
not to exceed the cholesteric-isotropic phase transition temperature of the liquid crystals used in the Fresnel lens (T=104° C.) and, therefore, not to disturb there alignment; and
to minimise shrinkage of the resin and, therefore, the mechanical stresses exerted on the lens during encapsulation and afterwards.

The following heating cycle is therefore used:
ramp from room temperature to 45° C. in 5 hours;
then ramp from 45° C. to 95° C. in 7 hours;
temperature kept constant at 95° C. for 1 hour; and
heating stopped and slow return to room temperature with the inertia of the oven (observed time taken: about 6 h).

The silicone moulds are then taken out of the oven. The pucks may be removed from the moulds for the subsequent surfacing, coating (with a lacquer/antireflection coating) and trimming steps.

It is then possible to use conventional surfacing, coating and trimming processes without running the risk of damaging the insert. All that is required is to ensure that subsequent heat treatments do not degrade any of the materials included in the insert.

The collectors could possibly if required be formed on the edge face of the lens before and/or after trimming.

The process for manufacturing an ophthalmic lens element equipped with an insert such as described in this invention may be used to produce a corrective lens but also a noncorrective lens, a sunglass lens, or even a visor or a mask.

The invention claimed is:

1. A process for manufacturing an ophthalmic lens element for a pair of spectacles comprising a front face and a back face and equipped with an insert, the process comprising:
providing an intermediate product made of a first material comprising a first and second frontal face and being an organic material, the second frontal face forming the back or front face of the ophthalmic lens element;
placing the insert on the first frontal face of the intermediate product, the insert being an optical waveguide or a controllable optical module to receive optical beams via an entrance surface and to guide the optical beams towards an eye of a wearer so as to create an informative image, the insert being an active optical component equipped with electrical, mechanical, optical or fluidic elements allowing it to be supplied with power and/or controlled;
depositing a second material in liquid form on the first frontal face of the intermediate product to cover at least partially the insert with said second material; and
solidifying the second material in order to form an integral portion of the intermediate product, wherein
the insert is adhesively bonded to the first frontal face of the intermediate product via visual reference marks ensuring that the insert is correctly positioned, the marks being arranged on the intermediate product.

2. The process of claim 1, wherein the depositing of the second material is carried out so that the integral portion is shaped to be the front or back face of the ophthalmic lens element.

3. The process of claim 1, further comprising machining the integral portion in order to shape the front or back face of the ophthalmic lens element.

4. The process of claim 1, wherein the first frontal face comprises a recess to receive at least one portion of the insert, and wherein depositing the second material comprises placing at least one portion of the insert in said recess.

5. The process of claim 1, wherein depositing the second material comprises holding the insert on the first frontal face.

6. The process of claim 1, wherein the second frontal face of the intermediate product is opposite the first frontal face, and wherein the second frontal face is formed by molding or machining in order to form the back or front face of the ophthalmic lens element.

7. The process of claim 1, wherein the first material is compatible with the second material.

8. The process of claim 1, wherein the first material of the intermediate product is identical to the second material.

9. A process for manufacturing an ophthalmic lens element equipped with an insert, the ophthalmic lens element comprising a front face and a back face, comprising:
providing an intermediate product made of a first material comprising a first and second frontal face, the second frontal face forming the back or front face of the ophthalmic lens element;
placing the insert on the first frontal face of the intermediate product, the insert being an optical waveguide or a controllable optical module to receive optical beams via an entrance surface and to guide the optical beams towards an eye of a wearer so as to create an informative image, the insert being an active optical component equipped with electrical, mechanical, optical or fluidic elements allowing it to be supplied with power and/or controlled;
depositing a second material in liquid form on the first frontal face of the intermediate product so as to cover at least partially the insert with the second material;
solidifying the second material in order to form an integral portion of the intermediate product; and
machining the integral portion in order to shape the front or back face of the ophthalmic lens element,
wherein the first material is organic, and
wherein the insert is adhesively bonded to the first frontal face of the intermediate product via visual reference marks ensuring that the insert is correctly positioned, these marks being arranged on the intermediate product.

10. The process of claim 1, further comprising grinding the ophthalmic lens element to fit in a spectacle frame.

11. The process of claim 9, further comprising grinding the ophthalmic lens element to fit in a spectacle frame.

\* \* \* \* \*